United States Patent
Story

(10) Patent No.: US 9,197,266 B2
(45) Date of Patent: Nov. 24, 2015

(54) LOW CURRENT RSSI DETECTOR

(71) Applicant: QUALCOMM TECHNOLOGIES INTERNATIONAL, LTD., Cambridge (GB)

(72) Inventor: Michael John Story, Whittlesford (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 67 days.

(21) Appl. No.: 14/168,153

(22) Filed: Jan. 30, 2014

(65) Prior Publication Data

US 2015/0215052 A1    Jul. 30, 2015

(51) Int. Cl.
*H04B 17/00* (2015.01)
*H04B 1/10* (2006.01)
*H04L 1/20* (2006.01)
*H04B 1/16* (2006.01)

(52) U.S. Cl.
CPC ............ *H04B 1/1027* (2013.01); *H04L 1/20* (2013.01); *H04B 1/16* (2013.01)

(58) Field of Classification Search
USPC .................. 455/67.11, 67.7, 115.1, 130, 131, 455/226.1, 226.2, 226.4, 232, 254, 232.1; 381/10
See application file for complete search history.

(56) References Cited

U.S. PATENT DOCUMENTS

| | | | | |
|---|---|---|---|---|
| 5,059,892 A | * | 10/1991 | Stoft | 455/226.1 |
| 5,125,105 A | * | 6/1992 | Kennedy et al. | 455/226.2 |
| 5,784,465 A | * | 7/1998 | Fujiwara | 381/10 |
| 2005/0085205 A1 | * | 4/2005 | Behzad | 455/226.1 |
| 2007/0004358 A1 | * | 1/2007 | Moorti | 455/226.2 |
| 2010/0289586 A1 | | 11/2010 | Moser et al. | |

OTHER PUBLICATIONS

GB Search Report issued in related GB Application No. 1413953.9, dated Dec. 9, 2014.

* cited by examiner

*Primary Examiner* — Thanh Le

(74) *Attorney, Agent, or Firm* — Procopio, Cory, Hargreaves & Savitch LLP

(57) ABSTRACT

An RSSI detector for determining a received signal strength of a received signal, including a transistor configured to operate in a non-linear mode to generate second order components of the received signal comprising a DC component and an AC component; a filter configured to attenuate the AC component of the generated signal to form a filtered signal; and a determination unit configured to determine the received signal strength of the received signal based on an amplitude of the filtered signal.

18 Claims, 2 Drawing Sheets

LOW CURRENT RSSI DETECTOR

BACKGROUND

A received signal strength indicator (RSSI) is used to measure the strength of signals received by a radio receiver. Typically, these signals include the wanted signal and unwanted other signals (sometimes called blockers or interferers). Generally, the receiver operates best when the wanted signal is at a usefully high level, thus it is advantageous to turn the gain up. However, this may cause the unwanted signals to overload the receiver and cause it to not receive the wanted signal properly. The RSSI provides a coarse view of whether the receiver can turn its gain up, or not. If it cannot, other strategies may be open to it—for example, additional filters, or asking the wanted transmitter to turn its amplitude up.

RSSI detectors are often configured to output a direct current or voltage (DC), because this uses fewer resources to measure and evaluate than an alternating current or voltage (AC). Thus they often comprise a rectification circuit to convert the incoming signal from an AC signal to a DC one. FIG. 1 illustrates a known rectification circuit of an RSSI detector. A complementary AC signal is input on lines 101a, 101b, and a DC reference level is input on line 102. A current source 105 provides operating current and capacitor 106 low pass filters current into load 107, making the voltage primarily change with the DC output. For sufficiently large signals devices 103a, 103b provide a non-linear transfer function that has the effect of rectifying a fraction of the incoming signal.

The rectification circuit of FIG. 1, and other known circuits, provide effective rectification when operated at a high enough operating current, but as the current drops their speed becomes a problem, and their performance drops.

With increased market demand for lower power/longer battery life electronic devices, a lower power solution to providing an effective RSSI detector is needed.

SUMMARY OF THE INVENTION

According to a first aspect, there is provided an RSSI detector for determining a received signal strength of a received signal, comprising: a transistor configured to operate in a non-linear mode to generate second order components of the received signal comprising a DC component and an AC component; a filter configured to attenuate the AC component of the generated signal to form a filtered signal; and a determination unit configured to determine the received signal strength of the received signal based on an amplitude of the filtered signal.

Suitably, the transistor is configured to have a transconductance proportional to the transistor's output current in the non-linear mode.

Suitably, the transistor comprises a control terminal and an output terminal, and the transistor is configured such that in the non linear mode, the voltage between the control terminal and the output terminal is below a threshold voltage between the control terminal and the output terminal.

The transistor may be a FET. The FET may be configured such that in the non-linear mode the gate-source voltage of the FET is below a gate-source threshold voltage of the FET.

The transistor may be an NMOS transistor. The transistor may be a PMOS transistor.

Suitably, the integrated circuit chip comprises a chip pin and receive circuitry connected to the chip pin, the receive circuitry comprising: the RSSI detector; and a low noise amplifier, the RSSI detector located in parallel with the low noise amplifier in the receive circuitry.

The receive circuitry may further comprise passive gain circuitry connected to the chip pin, wherein an output of the passive gain circuitry forms an input to both the RSSI detector and the low noise amplifier.

According to a second aspect, there is provided a method of determining a received signal strength of a received signal, comprising: at a transistor operating in a non-linear mode, generating second order components of the received signal comprising a DC component and an AC component; filtering the AC component of the generated signal to form a filtered signal; and determining the received signal strength of the received signal based on an amplitude of the filtered signal.

Suitably, in the non-linear mode, the transconductance of the transistor is proportional to the transistor's output current.

Suitably, in the non-linear mode, the voltage between a control terminal and an output terminal of the transistor is less than a threshold voltage between the control terminal and the output terminal of the transistor.

The transistor may be a FET and in the non-linear mode, the gate-source voltage of the FET is less than a gate-source threshold voltage of the FET.

Suitably, the method further comprises amplifying the received signal at a low noise amplifier.

Suitably, the method further comprises increasing a gain of the low noise amplifier if the determined received signal strength is below a threshold value.

The method may further comprise decreasing the gain of the low noise amplifier if the determined received signal strength is above a threshold value.

The method may further comprise applying passive gain to the received signal prior to forming the amplified signal at the transistor.

The method may further comprise, after applying passive gain to the received signal to form a passive gain signal, inputting the passive gain signal to both the transistor and a low noise amplifier.

BRIEF DESCRIPTION OF THE DRAWINGS

The present disclosure will now be described by way of example with reference to the accompanying drawings. In the drawings.

DETAILED DESCRIPTION

The following description is presented by way of example to enable any person skilled in the art to make and use the invention. The present invention is not limited to the examples described herein and various modifications to the disclosed examples will be readily apparent to those skilled in the art.

Figure 2:
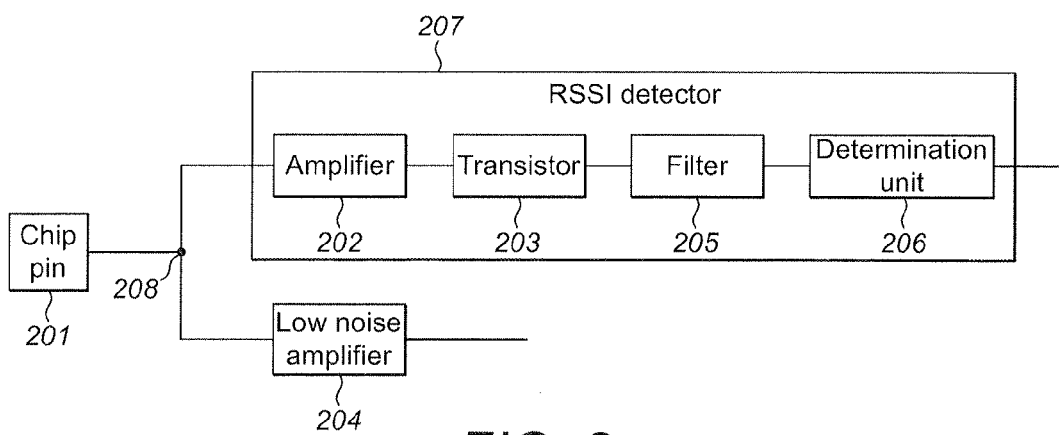
FIG. 2 illustrates receive circuitry on an integrated circuit chip comprising an RSSI detector.

FIG. 2 is a schematic diagram of exemplary receiver circuitry. This figure presents components of this circuitry in terms of functional blocks. Some functional blocks for carrying out functions well known in the art have in places been omitted from this figure.

FIG. 2 illustrates exemplary receive circuitry on an integrated circuit chip into which an RSSI detector is integrated. A signal is received at the chip pin 201. Suitably, this signal is a radio frequency (RF) signal. An RSSI detector 207 is coupled to the chip pin. Low noise amplifier 204 is also coupled to the chip pin. The RSSI detector comprises an amplifier 202, a transistor 203, a filter 205 and a determination unit 206. Suitably, amplifier 202 is a low power amplifier. For example, amplifier 202 may have an operating current of 30 μA. Amplifier 202 has sufficient sensitivity to detect an overload of low noise amplifier 204. Amplifier 202 may, for example, amplify the received signal by a factor of 5. The transistor 203 operates in a non-linear mode as described below. This causes the transistor 203 to generate a DC component related to the amplitude of the signal at its input, as described below. The signal output by the transistor 203 is then filtered at filter 205. Suitably, the filter is a low pass filter configured to attenuate the AC components of the signal output from the transistor 203. Thus, the filtered signal comprises mostly the DC component of the received signal. A determination unit 206 then determines a value for the received signal strength from the amplitude of the DC component of the filtered signal. Suitably, the determination unit 206 is implemented using a comparator which compares the filtered signal to a target reference value.

Optionally (not shown), a passive gain unit is located between the chip pin 201 and the node 208. Node 208 splits the received signal path into two signal paths: one to the RSSI detector 207 and the other to the low noise amplifier 204. Thus, the received signal undergoes passive gain amplification at the passive gain unit before being input to the RSSI detector 207. Similarly, the received signal undergoes passive gain amplification at the passive gain unit before being input to the low noise amplifier 204. For example, the received signal may be amplified by a factor of 5 at the passive gain unit.

Low noise amplifier 204 amplifies the received signal. Suitably, the RSSI detector receives the received signal prior to the received signal having been amplified at the low noise amplifier 204. For example, as shown on FIG. 2, the RSSI detector 207 and the low noise amplifier 204 are located in parallel in the receive circuitry. Both the RSSI detector 207 and the low noise amplifier 204 receive as an input the output of the chip pin 201 in FIG. 2. If the receive circuitry includes the optional passive gain unit, then both the RSSI detector 207 and the low noise amplifier 204 receive as an input the output of the passive gain unit.

Suitably, the receiver uses the RSSI value determined by the determination unit 206 to modify a characteristic or parameter of the receiver. For example, if the determined RSSI is below a threshold value, the receiver increases the gain of the low noise amplifier 204. As another example, if the determined RSSI is above a threshold value, the receiver decreases the gain of the low noise amplifier 204. Suitably, the gain of the amplifier 202 tracks the gain of the amplifier 204. Thus, if the receiver increases the gain of the amplifier 204, it increases the gain of the amplifier 202 by a corresponding amount. Similarly, if the receiver decreases the gain of the amplifier 204, it decreases the gain of the amplifier 202 by a corresponding amount.

The receiver may use the RSSI value determined by the determination unit 206 to request modification of a characteristic or parameter of the transmitter which transmitted the received signal. For example, if the determined RSSI value is below a threshold, the receiver may send a request to the transmitter that transmitted the received signal to increase the power of the signals it transmits to the receiver.

An exemplary operation of the RSSI detector 207 will now be described in more detail. The RSSI detector is arranged to output a direct current (DC) signal which is indicative of the received signal strength. Changes in the amplitude of a DC signal are more readily detectable than changes in the amplitude of an AC signal, thus changes in the RSSI are more readily detectable by implementing an RSSI detector which generates a DC output than an AC output.

The RSSI detector uses a transistor operating in a non-linear mode to generate a DC component from the received signal. In the non-linear mode, the current output by the transistor is not proportional to the voltage input to the transistor. For a small change in input voltage, the current output by the transistor increases dramatically. The current output by the transistor increases approximately exponentially with input voltage in this non-linear mode. Mathematically:

$$i_0 = \alpha e^{\beta V_0} \quad \text{(equation 1)}$$

where $\alpha$ and $\beta$ are constants, $i_0$ is the output current, and $V_0$ is an auto-zeroed bias voltage (described later).

This leads to a very high transconductance-to-current ratio. In low power devices, the operating current of the RSSI detector is very low. Thus, increasing the transconductance-to-current ratio of the amplifier increases the sensitivity of the RSSI detector at low operating currents.

The transistor comprises a control terminal and an output terminal. In the non-linear mode, the control terminal-to-output terminal voltage is less than a threshold control terminal-to-output terminal voltage. Suitably, the transistor is a field effect transistor (FET). In this case, the control terminal is the gate of the FET. The FET may be an NMOS transistor. Alternatively, the FET may be a PMOS transistor. In the case that the transistor is a MOS transistor, the non-linear mode is when the MOS is operating in a subthreshold region.

Taking an NMOS transistor as an example, the NMOS is operating in a subthreshold region when the gate-source voltage of the NMOS is lower than the gate-source threshold voltage of the NMOS. The gate-source threshold voltage of the NMOS is the gate-source voltage at which the NMOS transistor begins to connect the source of the transistor to the drain of the transistor and allow significant current to pass through. Above the gate-source threshold voltage, a channel is created between the doped regions at the source and drain, and this channel allows current to flow from the source to the drain, thus the transistor is ON. Below the gate-source threshold voltage, there is no channel, and thus the transistor may be considered to be OFF. However, some of the more energetic electrons are able to cross from the source to the drain causing a small subthreshold current. This subthreshold current has a non-linear relationship to the gate-source voltage. The subthreshold current output by the transistor increases approximately exponentially with the gate-source voltage.

Thus, the NMOS transistor operates in a highly non-linear manner when in its subthreshold region of operation. In particular, the exponential relationship between the input voltage and the output current causes the transistor to generate even order components of the received signal. The largest of these even order components are the second order components of the received signal which include a DC component and AC components. These are generated as follows. When a received signal is applied to the transistor, $$V_0 \rightarrow V_0 + \delta V \cdot \sin(\omega t) \quad \text{(equation 2)}$$

and $$i_0 + \delta i = \alpha e^{\beta(V_0 + \delta V \cdot \sin(\omega t))} \quad \text{(equation 3)}$$

Expanding the right hand side of the equation, and dropping the higher order terms leaves:

$$i_0 + \delta i \approx \alpha e^{\beta V_0}\left(1 + \beta \delta V \sin(\omega t) + \left(\frac{1}{2}\beta.\delta V\right)^2 (1 - \cos(2\omega t))\right) \quad \text{(equation 4)}$$

The AC components are filtered out to leave the DC component:

$$\frac{\delta i}{i_0} = \left(\frac{1}{2}\beta.\delta V\right)^2 \quad \text{(equation 5)}$$

For typical values of β, the sensitivity of the δV values are similar to the linear (non-overloaded) range of the low noise amplifier 204.

The above description is explained with respect to a NMOS transistor. A corresponding explanation applies to a PMOS transistor.

Figure 1:
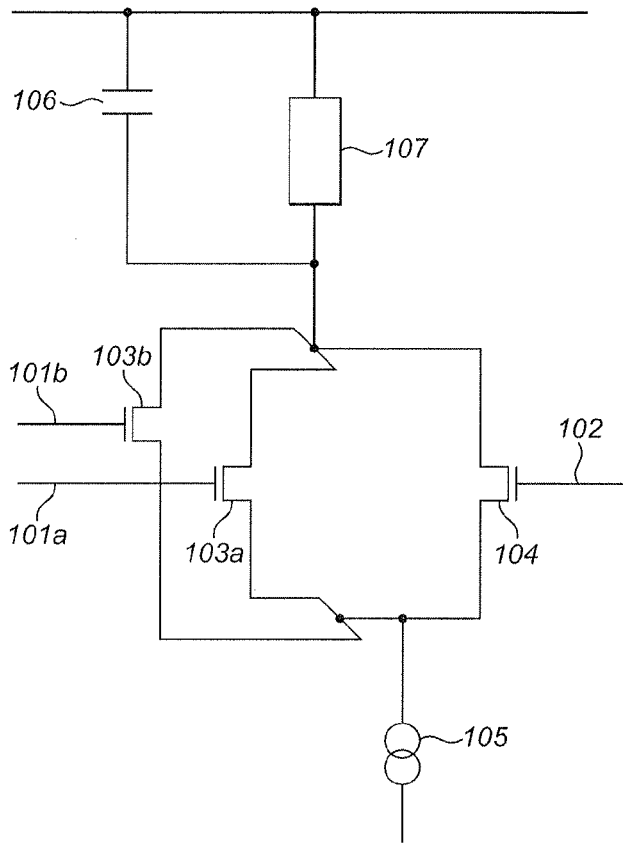
FIG. 1 illustrates a rectification circuit of a known RSSI detector.
Figure 3:
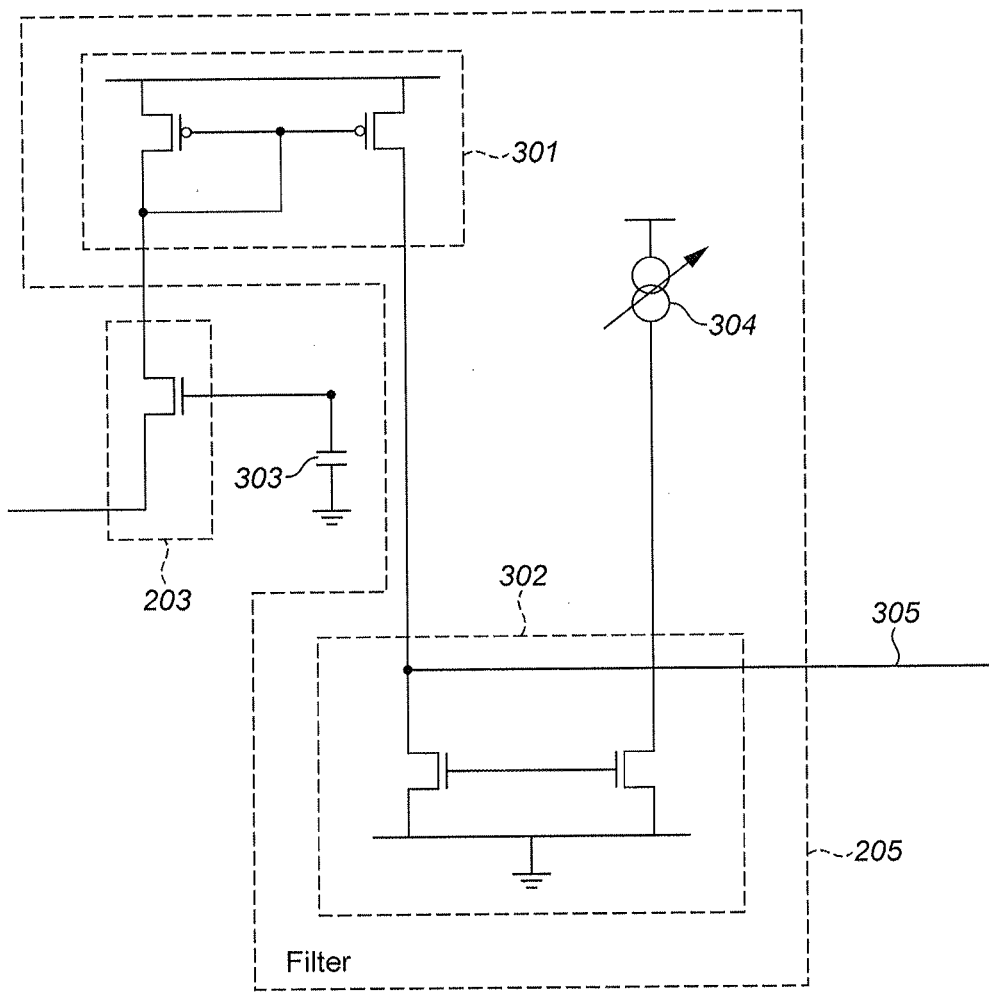
FIG. 3 illustrates an exemplary implementation of the transistor and filter of FIG. 2.

FIG. 3 illustrates an exemplary implementation of the transistor and filter of FIG. 2. The transistor 203 is a MOS transistor operating in a deep-subthreshold mode. The MOS transistor is a single ended device operating at a low current. For example, the MOS transistor may operate at a current of ~1 µA. The low operating current allows use of a very small device, which minimises the capacitive loading on the previous stage (i.e. the amplifier 202). This increases the speed and bandwidth of the transistor as a rectifier at low operating current compared to the rectifier of FIG. 1.

The output of the amplifier 202 forms the input to the source terminal of the MOS transistor. The control terminal of the MOS transistor is connected to smoothing capacitor 303. Capacitor 303 is a bias voltage storage device. The transistor 203 generates second order harmonic distortion from even small input signals. These second order components comprise a DC component and an AC component. Suitably, the transistor 203 is "autozeroed" just prior to attempting to detect a received signal. This is implemented, for example, by applying a shorted input signal (i.e. a zero input signal) to the control input of the transistor 203. Once the transistor has been auto-zeroed, changes in the output current of the transistor 203 comprise a DC component which represents the signal strength of the received signal. In autozeroed mode, the transistor 203 satisfies equation 1.

The filter 205 comprises a first filter stage 301 and a second filter stage 302. In the example of FIG. 3, the first and second filter stages are current mirrors. The current mirrors are low bandwidth because they use large devices with high stray capacitance and low operating currents. The current mirrors attenuate the AC components of the signal output from the transistor 203. Thus, the signal output from the filter 205 on line 305 is a DC signal.

The RSSI detector described above localises the generation of second order harmonic distortion (i.e. the non-linearity) to only one internal device, transistor 203. The transistor 203 is a single ended device operating in a sub threshold mode at a low current. This configuration provides a very high transconductance to current ratio, a high impedance load to the previous stage (amplifier 202), a fast (common gate) performance, and maximum non-linearity to small input signals for a MOS device operating at a low current.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An RSSI detector for determining a received signal strength of a received signal, comprising:
    a transistor configured to operate in a non-linear mode to generate second order components of the received signal comprising a DC component and an AC component;
    a filter configured to attenuate the AC component of the generated signal to form a filtered signal; and
    a determination unit configured to determine the received signal strength of the received signal based on an amplitude of the filtered signal.

2. An RSSI detector as claimed in claim 1, wherein the transistor is configured to have a transconductance proportional to the transistor's output current in the non-linear mode.

3. An RSSI detector as claimed in claim 1, wherein the transistor comprises a control terminal and an output terminal, and wherein the transistor is configured such that in the non linear mode, the voltage between the control terminal and the output terminal is below a threshold voltage between the control terminal and the output terminal.

4. An RSSI detector as claimed in claim 1, wherein the transistor is a FET.

5. An RSSI detector as claimed in claim 4, wherein the FET is configured such that in the non-linear mode the gate-source voltage of the FET is below a gate-source threshold voltage of the FET.

6. An RSSI detector as claimed in claim 1, wherein the transistor is an NMOS transistor.

7. An RSSI detector as claimed in claim 1, wherein the transistor is a PMOS transistor.

8. An integrated circuit chip comprising a chip pin and receive circuitry connected to the chip pin, the receive circuitry comprising:
    the RSSI detector of claim 1; and
    a low noise amplifier,
    the RSSI detector located in parallel with the low noise amplifier in the receive circuitry.

9. An integrated circuit chip as claimed in claim 8, wherein the receive circuitry further comprises passive gain circuitry connected to the chip pin, wherein an output of the passive gain circuitry forms an input to both the RSSI detector and the low noise amplifier.

10. A method of determining a received signal strength of a received signal, comprising:
    at a transistor operating in a non-linear mode, generating second order components of the received signal comprising a DC component and an AC component;
    filtering the AC component of the generated signal to form a filtered signal; and
    determining the received signal strength of the received signal based on an amplitude of the filtered signal.

11. A method as claimed in claim 10, wherein in the non-linear mode, the transconductance of the transistor is proportional to the transistor's output current.

12. A method as claimed in claim 10, wherein in the non-linear mode, the voltage between a control terminal and an output terminal of the transistor is less than a threshold voltage between the control terminal and the output terminal of the transistor.

13. A method as claimed in claim 10, wherein the transistor is a FET and in the non-linear mode, the gate-source voltage of the FET is less than a gate-source threshold voltage of the FET.

14. A method as claimed in claim 10, further comprising amplifying the received signal at a low noise amplifier.

15. A method as claimed in claim 14, further comprising increasing a gain of the low noise amplifier if the determined received signal strength is below a threshold value.

16. A method as claimed in claim 14, further comprising decreasing the gain of the low noise amplifier if the determined received signal strength is above a threshold value.

17. A method as claimed in claim 10, further comprising applying passive gain to the received signal prior to generating second order components of the received signal at the transistor.

18. A method as claimed in claim 17, further comprising, after applying passive gain to the received signal to form a passive gain signal, inputting the passive gain signal to both the transistor and a low noise amplifier.

* * * * *